United States Patent
Majoulet

(10) Patent No.: US 10,731,023 B2
(45) Date of Patent: Aug. 4, 2020

(54) METHOD FOR PRODUCING A MATERIAL CONTAINING A POLYMER

(71) Applicant: NANOMAKERS, Rambouillet (FR)

(72) Inventor: Olivier Majoulet, Versailles (FR)

(73) Assignee: NANOMAKERS, Rambouillet (FR)

( * ) Notice: Subject to any disclaimer, the term of this patent is extended or adjusted under 35 U.S.C. 154(b) by 4 days.

(21) Appl. No.: 15/759,370

(22) PCT Filed: Sep. 9, 2016

(86) PCT No.: PCT/EP2016/071346
§ 371 (c)(1),
(2) Date: Mar. 12, 2018

(87) PCT Pub. No.: WO2017/046014
PCT Pub. Date: Mar. 23, 2017

(65) Prior Publication Data
US 2018/0251625 A1 Sep. 6, 2018

(30) Foreign Application Priority Data
Sep. 16, 2015 (FR) ..................... 15 58700

(51) Int. Cl.
*C08K 3/34* (2006.01)
*C08K 3/14* (2006.01)
*C08K 3/04* (2006.01)
*C08L 27/12* (2006.01)

(52) U.S. Cl.
CPC ............... *C08K 3/34* (2013.01); *C08K 3/04* (2013.01); *C08K 3/14* (2013.01); *C08K 2201/002* (2013.01); *C08K 2201/003* (2013.01); *C08K 2201/011* (2013.01)

(58) Field of Classification Search
USPC ....................................................... 524/443
See application file for complete search history.

(56) References Cited

U.S. PATENT DOCUMENTS

| 4,408,004 A * | 10/1983 | Pengilly ............. C08K 3/04 524/398 |
| 2004/0122150 A1 | 6/2004 | Quillen et al. |
| 2009/0170998 A1 | 7/2009 | Gupta et al. |
| 2012/0289641 A1 | 11/2012 | Hirano et al. |

OTHER PUBLICATIONS

Wozniak et al, "Novel Polymer Nanocomposite with Silicon Carbide Nanopaticles," Oriental Journal of Chemistry, vol. 31(3), 1545-1550 (2015). (Year: 2015).*
Liao et al, "Effect of Silicon Carbide Nanoparticle Additions on Microstructure and Mechanical Behavior of Maleic Anhydride Compatibilized High Density Polyethylene Composites," Composite Interfaces, 18 (2011) 107-120. (Year: 2011).*
Shuai et al., "Preparation and Mechanical Properties of Micro- and Nano-sized SiC/Fluoroelastomer Composites," Journal of Wuhan University of Technology, Materials Science Edition (2013), 28(4), pp. 658-663.
French Search Report from French Patent Application No. 1558700, dated Mar. 4, 2016.
International Search Report from International Patent Application No. PCT/EP2016/071346, dated Nov. 7, 2016.

* cited by examiner

*Primary Examiner* — Fred M Teskin
(74) *Attorney, Agent, or Firm* — Greer, Burns & Crain, Ltd.

(57) ABSTRACT

A method for producing a material, in which method the following products are incorporated so as to produce a mixture: a polymer; and particles including silicon and carbon. A feature of the method is that during the incorporation of the particles, the particles have an apparent density of more than 0.3 grams per cubic centimeter. Also, in embodiments, the particles have an average diameter which is less than or equal to 100 nanometers, preferably with a standard deviation which is less than 50% of the average diameter.

16 Claims, 2 Drawing Sheets

METHOD FOR PRODUCING A MATERIAL CONTAINING A POLYMER

BACKGROUND

The present invention relates to a method for producing a polymer-based material. It also relates to the material obtained by such a method.

Such a production method makes it possible for example to produce a polymer-based material having a good breaking strength and/or a low plastic deformation on compression.

Methods for producing polymer-based materials are known.

For example, the article entitled "Preparation and Mechanical Properties of Micro- and Nano-sized SiC/Fluoroelastomer Composites" published in the "Journal of Wuhan University of Technology-Mater. Sci. Ed." Vol 28 No. 4, August 2013 describes a production method in which a polymer (fluoroelastomer FKM) is mixed with particles (silicon carbide SiC), and shows that the incorporation of the particles improves certain mechanical properties of the polymer such as its breaking strength for example.

The purpose of the present invention is to propose a production method that further improves certain mechanical properties of a polymer with respect to the state of the art.

SUMMARY

This objective is achieved with a method for the production of a material, a method in which the following products are incorporated in order to produce a mixture:
- a polymer,
- particles comprising silicon and carbon (preferably particles of silicon carbide).

According to a first aspect of the invention, on incorporation of the particles, the particles can have an apparent density greater than 0.16 grams per $cm^3$, preferably greater than 0.2 grams per $cm^3$, optimally greater than 0.3 grams per $cm^3$, ideally greater than 0.4 grams per $cm^3$.

According to a second aspect of the invention, the particles preferably have a average diameter less than or equal to 100 nanometres.

These two aspects can be envisaged alone or in combination: as described hereinafter, the small diameter of the particles, (preferably with a small standard deviation) and a high apparent density of the particles on incorporation of the particles into the mixture both allow the mechanical performances of the material obtained to be improved.

The particles preferably have an average diameter with a standard deviation less than 50% of this average diameter.

The particles can have an average diameter greater than or equal to 15 nanometres.

The polymer is preferably a fluoropolymer, preferably a fluoroelastomer (typically of the FKM or FFKM type).

The polymer can be a perfluoropolymer, preferably a perfluoroelastomer.

The mixture can comprise:
- 100 parts by weight of the polymer, and
- a minimum of 0.01 parts by weight of the particles and/or a maximum of 30 parts by weight of the particles.

The products incorporated in the mixture can also comprise carbon black. This mixture can comprise:
- 100 parts by weight of the polymer, and
- a minimum of 0.01 parts by weight of carbon black and/or a maximum of 50 parts by weight of carbon black.

The products incorporated in the mixture can also comprise a bonding agent.

The products incorporated in the mixture can also comprise a mould release agent.

On incorporation of the particles, the specific surface of the particles is preferably less than 130 $m^2 \cdot g^{-1}$ (preferably less than 75 $m^2 \cdot g^{-1}$).

According to yet another aspect of the invention, a material is proposed that is obtained with a production method according to the invention.

BRIEF DESCRIPTION OF THE DRAWINGS

Other advantages and features of the invention will become apparent on reading the detailed description of implementations and embodiments which are in no way limitative, and from the following attached drawings.

DETAILED DESCRIPTION

Figure 1:
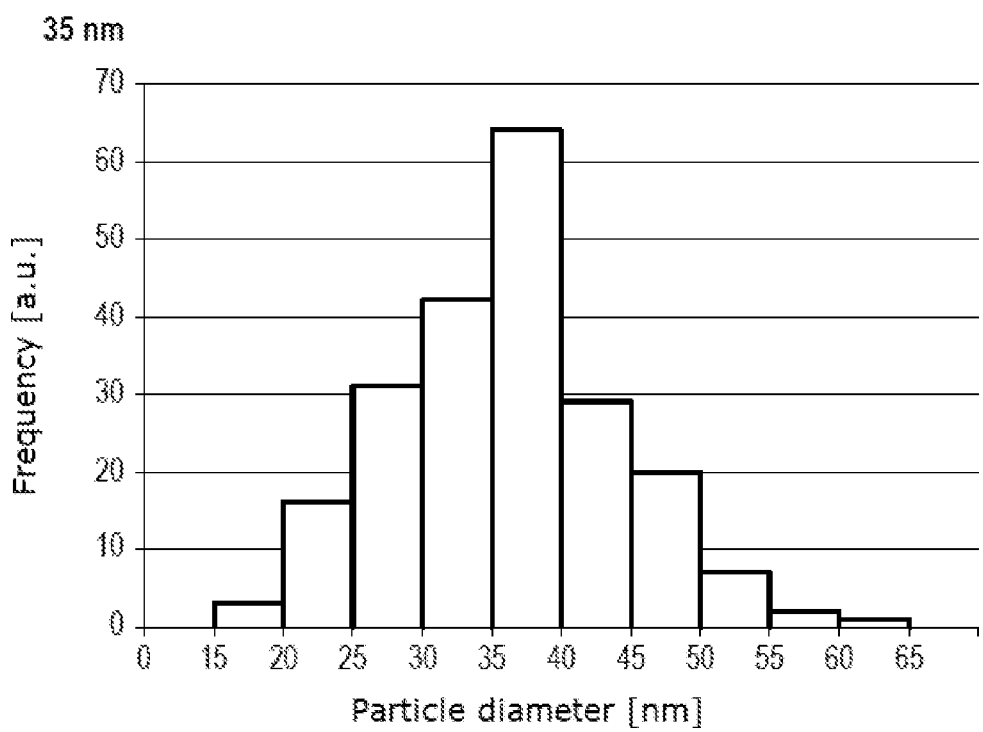
FIG. 1 shows a granulometric distribution of the SiC particles used for samples No. 2 and No. 3 of material according to the invention (on the y axis, the frequency corresponds to a number of particles in a diameter interval)

As these embodiments are in no way limitative, variants of the invention can be considered comprising only a selection of the characteristics described or illustrated hereinafter, in isolation from the other characteristics described or illustrated (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, a first embodiment of the method according to the invention, and the materials according to the invention obtained with this method, will be described.

This first embodiment according to the invention is a method for the production of a solid material.

According to this embodiment, the following products are incorporated in order to produce a mixture:
- 100 parts by weight of a polymer (preferably an elastomer, preferably a fluoropolymer or fluoroelastomer, preferably of FKM or FFKM type) typically comprising a base still in liquid or pasty or powder form, or in balls (for example in the case of an elastomer)
- a minimum of 0.01 (preferably 0.1) parts by weight of the particles and/or a maximum of 30 (preferably 25) parts by weight of particles comprising silicon and carbon. The particles are preferably particles of silicon carbide SiC; preferably with:
  - for each particle 1 atom of silicon for between 0.9 and 1.0 atoms of carbon and
  - an oxygen content by weight less than 0.8% preferably a concentration of iron atoms less than 40 ppm, preferably less than 5 ppm, preferably less than 4 ppm preferably a concentration of chromium atoms less than 20 ppm, preferably less than 2 ppm, preferably less than 1 ppm.

preferably a concentration of nickel atoms less than 5 ppm, preferably less than 1 ppm, preferably less than 0.5 ppm.

On their incorporation, the particles are "fresh" i.e. produced (typically by laser pyrolysis) less than 2 months beforehand.

A polymer is a substance composed of molecules that are characterized by the repetition, several times, of one or several atoms or groups of atoms.

An elastomer is a polymer having "elastic" properties (typically a modulus of elasticity comprised between 0.001 and 0.1 Gpa at 20° C. and atmospheric pressure of 1 atmosphere) obtained after cross-linking.

Optionally, one or more polymer cross-linking or vulcanization agent(s) can be added to the mixture, depending on the polymer used (this may be obligatory according to the polymer, and reference should be made to the instructions for use of this polymer).

Optionally, a bonding agent can also be added to the mixture, for example Si69 bis(triethoxysilylpropyl) tetrasulphide $C_{18}H_{42}O_6Si_2S_4$ or aminopropyltriethoxysilane. The function of the bonding agent is to create a coupling or a bond between the polymer and the particles comprising carbon and silicon, preferably while facilitating the dispersion of the particles in the elastomer matrix. By "bonding agent" is meant an agent arranged in order to create chemical or physical bonds between the particles and the polymer, and which typically has the general chemical formula Y-T-X, with Y a functional group arranged in order to bond physically or chemically with the particles, X a functional group arranged in order to bond physically or chemically with the elastomer and T a group bonding the X and Y groups; examples of bonding agents can be seen in the description of U.S. Pat. No. 7,202,295.

Optionally, a mould release agent can also be added to the mixture. Examples of mould release agents will be easily apparent to a person skilled in the art, and comprise fatty acids of zinc, calcium, or magnesium and lithium fatty acid salts and organic phosphate esters. Specific examples comprise stearic acid, zinc stearate, calcium stearate, magnesium stearate, lithium stearate, calcium oleate and zinc palmitate.

Optionally, carbon black can also be added to the mixture, typically at a minimum of 0.01 (preferably 0.1) parts by weight of carbon black and/or at a maximum of 50 parts by weight of carbon black.

After the incorporation of these different products into the mixture, the polymer cross-links (in the case of an elastomer supplied in the form of solid "balls", this cross-linking is obtained moreover under the simultaneous effect of heat and bearing stress). In this way, a solid material is obtained.

The polymer is preferably a fluoropolymer or fluorinated polymer, i.e. a polymer the repeat unit of which is a fluorocarbon, and which therefore comprises several carbon-fluorine bonds. This fluoropolymer preferably has a fluorine content greater than or equal to 62% by weight of fluorine atoms (and/or less than or equal to 72%). This fluoropolymer is preferably a fluoroelastomer, i.e. a fluoropolymer having elastic properties, preferably selected from:

a FKM (according to standard ASTM D1418 in its version current at $1^{st}$ August 2015 or also called FPM according to standard ISO(/DIN) 1629:1995 in its version current at $1^{st}$ August 2015, for "Fluorinated Propylene Monomer"), preferably produced from vinylidene fluoride (VDF or VF2), from the five subcategories listed by the ASTM standard:

FKM of type 1: copolymer of hexafluoropropylene (HFP) and vinylidene fluoride (VDF or VF2);

FKM of type 2: terpolymer of tetrafluoroethylene (TFE), vinylidene fluoride (VDF or VF2) and hexafluoropropylene (HFP);

FKM of type 3: terpolymer of tetrafluoroethylene (TFE), perfluoromethylvinylether (PMVE) and vinylidene fluoride (VDF or VF2);

FKM of type 4: terpolymer of tetrafluoroethylene (TFE), propylene and vinylidene fluoride (VDF or VF2);

FKM of type 5: pentapolymer of tetrafluoroethylene (TFE), hexafluoropropylene (HFP), ethylene, perfluoromethylvinylether (PMVE) and vinylidene fluoride (VDF or VF2).

a FKM (according to standard ASTM D1418 in its version current at 1st August 2015 or also called FFPM according to standard ISO(/DIN) 1629:1995 in its version current at $1^{st}$ August 2015), or perfluoroelastomer or perfluorinated polymer (which is therefore a perfluoropolymer or perfluorinated polymer, i.e. the carbon chain of which is totally fluorinated), which is generally a terpolymer of tetrafluoroethylene (TFE), perfluoromethylvinylether (PMVE) and a third monomer (other than vinylidene fluoride).

a FEKM (according to standard ASTM D1418 in its version current at $1^{st}$ August 2015 or also called FEPM according to standard ISO(/DIN) 1629:1995 in its version current at 1st August 2015) which is a copolymer of tetrafluoroethylene (TFE) and propylene.

On incorporation of the particles, (i.e. just before the particles enter the mixture) the particles (typically in the form of granules or grains or pulverulent or powder form) have an apparent density greater than 0.16 grams per $cm^3$, preferably greater than 0.2 grams per $cm^3$, optimally greater than 0.3 grams per $cm^3$, ideally greater than 0.4 grams per $cm^3$, or even greater than or equal to 0.45 grams per $cm^3$. Thus, preference will be given to the form of granules of at least $5 \cdot 10^4$ $\mu m^3$ for the particles on incorporation of the particles.

The apparent density ρ (also called bulk density) is a well known variable that is clear to a person skilled in the art. It is a variable used with substances present in the form of powder or granules, so as to take account of the weight M of material contained in a given total volume $V_{tot}$, this total volume comprising the volume of interstitial air between the granules or particles or grains of the powder. From this point of view, the bulk density of one and the same granular or pulverulent material can vary depending on the means of handling, according to whether it is more or less packed, or on the other hand, aerated:

$$\rho = \frac{M}{V_{tot}}$$

According to normal practice, this bulk density is generally expressed in grams per cubic centimetre ($g \cdot cm^{-3}$).

On incorporation of the particles (i.e. just before the particles enter the mixture), the particles have an average diameter greater than or equal to 15 nanometres and/or greater than or equal to 100 nanometres (or even less than or equal to 35 nanometres).

The average diameter is preferably calculated or measured statistically according to a geometric average.

The average diameter is preferably calculated or measured by a granulometric analysis using mathematical morphology (typically with ImageJ software, c.f. the software platform Cepia Granulometry by mathematical morphology under ImageJ. url: http://www.pfl-cepia.inra.fr/index.php?%20page=ijGranulometry).

With respect to mathematical morphological granulometry and the utilization of the geometrical average, reference may be made for example to the article by D. Legland et al entitled "*Cartography of cell morphology in tomato pericarp at the fruit scale*". Journal of Microscopy Vol. 247, pages 78-93 (2012), in particular page 81.

More specifically, the average diameter of a type of particles is preferably calculated statistically according to a geometrical average, this average being calculated over a number (at least one hundred, preferably several hundred) measurements of the diameter of different particles of this type by granulometric analysis using mathematical morphology.

On incorporation of the particles (i.e. just before the particles enter the mixture), the particles have an average diameter with a standard deviation less than 50% (preferably 40%) of this average diameter.

The standard deviation (also called measure of dispersion) of the diameter of a type of particles is preferably calculated according to the following standard formula detailed hereinafter, originating from all the measurements of the diameter of different particles of this type by granulometric analysis using mathematical morphology (having served for calculating the average of this diameter):

$$s = \left[\sum_{i=1}^{n} g_i \cdot (x_i - m)^2\right]^{1/2}$$

Description of Samples 2 to 7 of Materials Obtained According to the Invention and of the Reference Sample 1.

Figure 2:
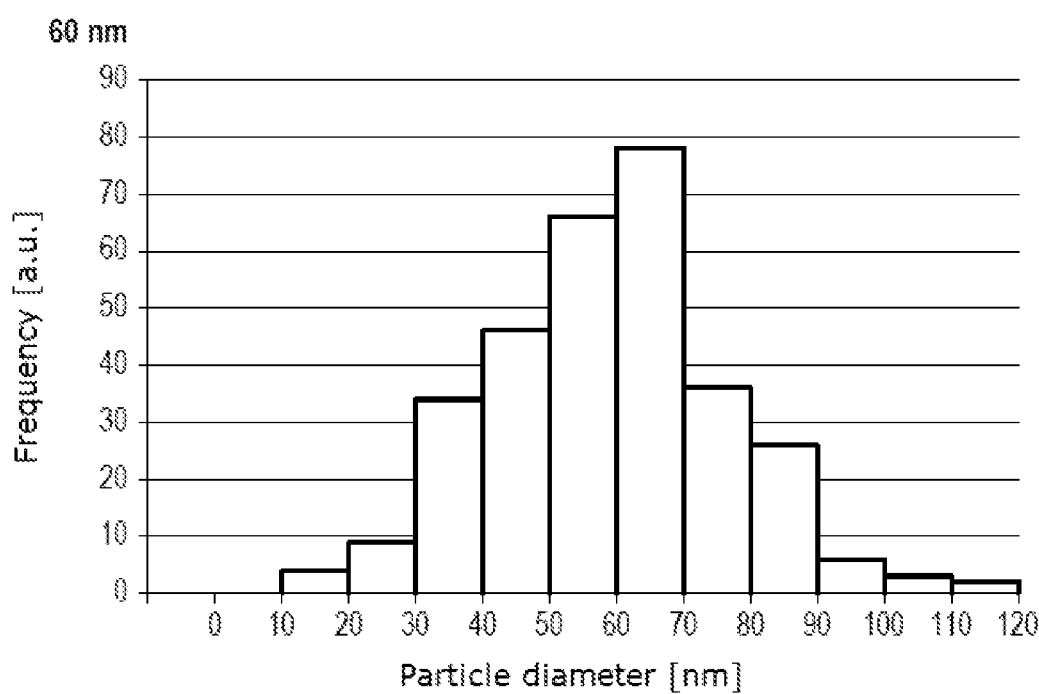
FIG. 2 shows a granulometric distribution of the SiC particles used for samples No. 4 and No. 5 of material according to the invention (on the y axis, the frequency corresponds to a number of particles in a diameter interval)
Figure 3:
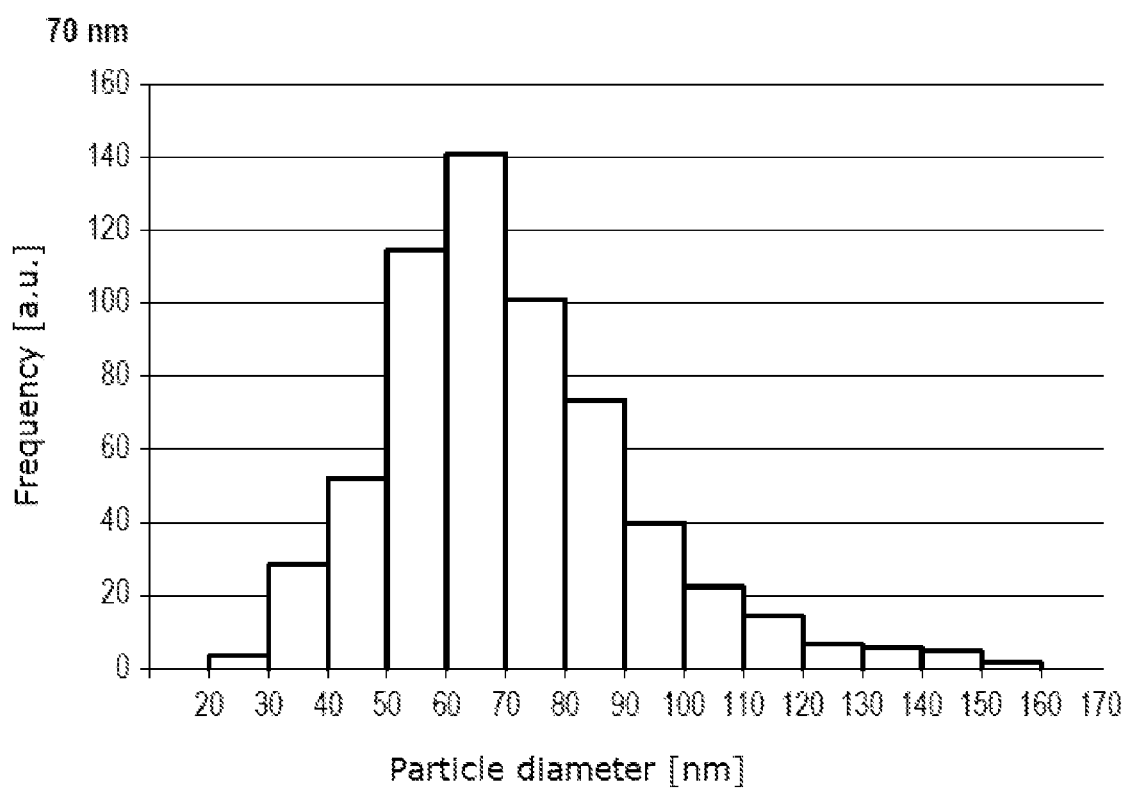
FIG. 3 shows a granulometric distribution of the SiC particles used for samples No. 6 and No. 7 of material according to the invention (on the y axis, the frequency corresponds to a number of particles in a diameter interval).

The first embodiment of the method according to the invention was implemented with three types of particles:
type 1: silicon carbide particles of average diameter 35 nanometres, with a standard deviation of 13 nanometres (13/35≈37.1% of the average diameter), and a granulometric distribution of which is shown in FIG. 1.
type 2: silicon carbide particles of average diameter 60 nanometres, with a standard deviation of 17 nanometres (17/60≈28.3% of the average diameter), and a granulometric distribution of which is shown in FIG. 2, and
type 3: silicon carbide particles of average diameter 70 nanometres, with a standard deviation of 21 nanometres (21/70≈30% of the average diameter), and a granulometric distribution of which is shown in FIG. 3.

It is noted that for each of these types of particles used in a method according to the invention, there is no particle having a diameter greater than 200 nanometres.

It is noted that even for the type 1 particles used in a method according to the invention, there is no particle having a diameter greater than 100 nanometres.

Samples of material 1 (reference) and 2 to 7 (according to the invention) were obtained by the first embodiment of the method according to the invention described above, incorporating the following products in order to produce the mixture:
100 parts by weight of the polymer; despite the invention working for other polymers (and it works in particular very well for all the FKM and FFKMs), in this illustration the same fluoropolymer is used: Dyneon™ FC 2181, which is a copolymer of vinylidene fluoride and hexafluoropropylene. This makes it possible to introduce the smallest possible variation between samples, so as to be able subsequently to easily identify the effects of the granulometry and of the apparent density on the materials obtained,
0 parts by weight of SiC particles for sample 1 (reference sample) and 4 parts by weight of SiC type 1 particles for samples 2 and 3, type 2 for samples 4 and 5 and type 3 for samples 6 and 7. The apparent density of the SiC particles was also varied,
6 parts by weight of calcium hydroxide and 3 parts by weight of magnesium oxide for the cross-linking or vulcanization of the polymer in the mixture,
0.3 parts by weight of Struktol HT290 as mould release agent,
0.2 parts by weight of bis(triethoxysilylpropyl)tetrasulphide as bonding agent.

For samples 1 to 7, the fill level of the mixer (reference Polylab Rheomix 3000) is always the same, and equal to 66%.

Table 1 below summarizes the type of SiC particles utilized for each of samples 2 to 7:

TABLE 1

| SiC particles used for sample No. | Average diameter of the SiC particles [nm] | Standard deviation of the SiC particles [nm] | Apparent density of the SiC particles on incorporation into the mixture [g · cm$^{-3}$] | Loading rate of SiC particles in the mixture [pce = percentage of elastomers] |
|---|---|---|---|---|
| 1 | — | — | — | — |
| 2 | 35 | 13 | 0.045 | 4 |
| 3 | 35 | 13 | 0.45 | 4 |
| 4 | 60 | 17 | 0.175 | 4 |
| 5 | 60 | 17 | 0.45 | 4 |
| 6 | 70 | 21 | 0.125 | 4 |
| 7 | 70 | 21 | 0.195 | 4 |

In order to characterize the average diameter and the standard deviation of the diameter of the different SiC particles used, these different types or batches of particles were analyzed using a JEOL 2000EX transmission electron microscope (TEM) operating at an accelerating voltage of 200 kV. The batches supplied in the form of nanometric powders were prepared as follows: a scoopula tip was taken and dispersed in ethanol. The mixture was then placed in an ultrasound bath for 5 minutes in order to obtain a good dispersion. Using a syringe, 10 µl of the mixture was deposited on a copper grid of 400 mesh covered by a membrane of formvar/C. The grids thus obtained were observed in the TEM.

For each batch of SiC particles, around ten images were acquired. For the determination of the size distribution, a granulometric analysis by mathematical morphology using ImageJ was carried out. For this purpose, the "ijGranulometry" plugin was used.

The principle of granulometry by mathematical morphology is rehearsed below. The idea of granulometry by mathematical morphology is to apply to the image, filters defined by a structuring element of a given shape (here an octagon), the size of which varies (cf. P Soille. "*Morphological Image Analysis*" 2nd Ed., Springer, 2003). By measuring the variations of the image between two sizes of filters, curves can be constructed that provide information, in grey levels, on the size distribution of the structures observed.

By applying openings or closings of increasing size, increasingly large light or dark structures can be made to disappear. Screening of the image is carried out, by separating the structures of the image as a function of their size. The difference between the two images is measured by calculating the sum of the grey levels of each image. The curve of the sum of the grey levels increases or reduces monotonically, and ends by reaching a plateau. The derivative of this curve corresponds to a size distribution of the structures in the image. Mathematically, if $V_i$ is the volume (sum of the grey levels) of the image at iteration i, the corresponding granulometric curve is given by:

$$g_i = \frac{V_{i+1} - V_i}{V_\infty - V_0}$$

where $V_\infty$ corresponds to the sum of the grey levels at stability, and $V_0$ to the sum of the grey levels in the image of origin.

It is noted that the granulometric curves often follow a log-normal law. It is possible to calculate several synthetic parameters for these curves, in particular the average size in grey levels:

$$m = \sum_{i=1}^{n} g_i \cdot x_i$$

It is also possible to calculate the standard deviation of the distribution:

$$s = \left[ \sum_{i=1}^{n} g_i \cdot (x_i - m)^2 \right]^{1/2}$$

Finally, due to the appearance of the curves, the average value in grey levels is often a very long way from the mode.

An alternative therefore consists of calculating an average size by the geometrical average:

$$m_g = \exp\left[ \sum_{i=1}^{n} g_i \cdot \log x_i \right]$$

The true density is measured with a helium pycnometer. The samples are degassed for 4 hours at 120° C. before any measurement.

The apparent density is measured according to the standard ISO 3923-2:1981. The material (powder or granules), dried beforehand for 4 h at 120° C., is poured into a cylinder of known volume and equal to 25 cm³ until the latter is full.

Table 2 below summarizes different physical properties of the different types of SiC particles used for each of samples 2 to 7:

TABLE 2

| | SiC particles used for sample No. | | | | | |
|---|---|---|---|---|---|---|
| | 2 | 3 | 4 | 5 | 6 | 7 |
| average diameter of SiC particles [nm] | 35 | 35 | 60 | 60 | 70 | 70 |
| apparent density of the SiC particles [g · cm⁻³] | 0.045 | 0.45 | 0.175 | 0.45 | 0.125 | 0.195 |
| Specific surface area- by Brunauer-Emmett-Teller (BET) method [m² · g⁻¹] | 56 | 59 | 27 | 28 | 20 | 21 |
| true density by He pycnometry [g · cm⁻³] | 3.1 | 3.1 | 3.2 | 3.2 | 3.2 | 3.2 |

It is noted that, on incorporation of the particles, (i.e. just before the particles enter the mixture) the specific surface area of the particles is greater than 15 m²·g⁻¹ and/or less than 130 m²·g⁻¹ (preferably less than 75 m²·g⁻¹).

Table 3 below summarizes different rheological properties at 177° C. of the samples 1 to 7 according to standard ASTM D 2084 originating from a Monsanto Moving Die Rheometer reference MDR 2000 from Alpha Technologies by using the following parameters: 100 cycles per minute (1.66 Hz), 0.5 degrees of amplitude).

TABLE 3

| Sample No. | ML = minimum torque [dN · m] | MH = maximum torque [dN · m] | Ts2 = time in order to observe an increase of 2 inch-lb (equivalent in SI units to 2.26 dN · m) with respect to the minimum torque [min] | T90 = time in order to obtain 90% cross-linking [min] | Cross-linking time [min] |
|---|---|---|---|---|---|
| 1 | 1.1 | 11.6 | 1 | 1.5 | 6 |
| 2 | 1.3 | 12.1 | 0.8 | 1.2 | 6 |
| 3 | 1.5 | 14.1 | 0.9 | 1.2 | 6 |
| 4 | 1.2 | 12.5 | 0.9 | 1.3 | 6 |
| 5 | 1.2 | 12.4 | 0.9 | 1.3 | 6 |
| 6 | 1.2 | 12.4 | 0.9 | 1.3 | 6 |
| 7 | 1.2 | 12.5 | 0.9 | 1.3 | 6 |

Table 4 below summarizes different mechanical properties of samples 1 to 7 after cross-linking.

TABLE 4

| Sample No. | Hardness [Shore-A] | M50 = modulus at 50% elongation [MPa] | M100 = modulus at 100% elongation [MPa] | M200 = modulus at 200% elongation [MPa] | BS = breaking strength [MPa] | EB = elongation at break | DRC = compression set [%] |
|---|---|---|---|---|---|---|---|
| 1 | 58 ± 0.3 | 1.1 ± 0.1 | 1.8 ± 0.1 | 5.6 ± 0.2 | 11.7 ± 0.8 | 316 ± 12 | x |
| 2 | 61 ± 0.2 | 1.3 ± 0.1 | 2.3 ± 0.1 | 7 ± 0.2 | 12.2 ± 1 | 294 ± 30 | 6 ± 0.05 |
| 3 | 65 ± 0.2 | 1.6 ± 0.1 | 3.4 ± 0.1 | 11.2 ± 0.1 | 15.6 ± 1 | 249 ± 25 | 5 ± 0.15 |
| 4 | 62 ± 0.3 | 1.3 ± 0.1 | 2.4 ± 0.1 | 7.2 ± 0.2 | 11.8 ± 0.7 | 286 ± 30 | 6 ± 0.51 |
| 5 | 62 ± 0.2 | 1.3 ± 0.1 | 2.3 ± 0.1 | 6.8 ± 0.2 | 12 ± 1 | 293 ± 29 | 6 ± 0.21 |
| 6 | 61 ± 0.3 | 1.3 ± 0.1 | 2.3 ± 0.1 | 7 ± 0.2 | 11.2 ± 1 | 283 ± 20 | 7 ± 0.24 |
| 7 | 61 ± 0.3 | 1.2 ± 0.1 | 2.1 ± 0.1 | 6.6 ± 0.1 | 11.3 ± 1 | 285 ± 23 | 7 ± 0.5 |

It is noted that two factors make it possible to improve the mechanical properties of the material obtained:
- a small granulometry (small average diameter and preferably small standard deviation), as shown by the differences in the value for Hardness, M100, M200, BS and DRC between samples 3 and 5,
- a high apparent density, as shown by the differences in the value for Hardness, M100, M200, BS and DRC between samples 2 and 3. This surprising technical effect is obtained above all for small particles, preferably having an average diameter less than 50 nm, preferably less than or equal to 35 nm.

The advantages of the invention with respect to the state of the art are significant:
according to the invention, the breaking strength (BS) is improved by 33% between sample 1 without SiC particles and sample 3 which comprises 4 parts by weight of SiC for 100 parts of polymer; and
according to the state of the art ("Preparation and Mechanical Properties of Micro- and Nano-sized SiC/Fluoroelastomer Composites" Journal of Wuhan University of Technology-Mater. Sci., Vol. 28 No. 4, 2013), a use of SiC that is however slightly greater (5 parts by weight for 100 parts of polymer) only makes it possible to improve the breaking strength by 7% (see table at the foot of page No. 660 of this article, comparison of the tensile strength between samples FKM-0 and FKM-5).

Optional Utilization of Carbon Black

Other samples were produced by adding into the mixture (with respect to samples 2 to 7) 9 or 18 parts by weight of carbon black, with the same fill level of the mixer as for samples 1 to 7. This makes it possible to further improve the mechanical properties, but less expensively than if a further 9 or 18 parts by weight of SiC particles were added.

Of course, the invention is not limited to the examples which have just been described and numerous adjustments can be made to these examples without exceeding the scope of the invention.

Of course, the different characteristics, forms, variants and embodiments of the invention can be combined together in various combinations to the extent that they are not incompatible or mutually exclusive. In particular, all the variants and embodiments described above can be combined together.

The invention claimed is:

1. A method for the production of a material, said method comprising incorporating the following products in order to produce a mixture:
a polymer;
particles comprising silicon and carbon, and having an average diameter less than or equal to 100 nanometres; and
on incorporation of the particles, the particles have an apparent density greater than 0.3 grams per cubic centimetre.

2. The method according to claim 1, characterized in that for each particle there is 1 atom of silicon for between 0.9 and 1.0 atoms of carbon.

3. The method according to claim 1, characterized in that the particles have:
a concentration of iron atoms less than 40 ppm, and/or
a concentration of chromium atoms less than 20 ppm, and/or
a concentration of nickel atoms less than 5 ppm.

4. The method according to claim 1, characterized in that, on incorporation of the particles, the particles have an apparent density greater than 0.4 grams per $cm^3$.

5. The method according to claim 1, characterized in that the particles have an average diameter greater than or equal to 15 nanometres.

6. The method according to claim 1, characterized in that in the particles have an average diameter with a standard deviation less than 50% of this average diameter.

7. The method according to claim 1, characterized in that in the polymer is a fluoropolymer.

8. The method according to claim 7, characterized in that in the fluoropolymer is a perfluoropolymer.

9. The method according to claim 1, characterized in that the mixture comprises
100 parts by weight of the polymer; and
a minimum of 0.01 parts by weight of the particles and/or a maximum of 30 parts by weight of the particles.

10. The method according to claim 1, characterized in that the products incorporated in the mixture also comprise carbon black.

11. The method according to claim 10, characterized in that the mixture comprises:
100 parts by weight of the polymer; and
a minimum of 0.01 parts by weight of carbon black and/or a maximum of 50 parts by weight of carbon black.

12. The method according to claim 1, characterized in that the products incorporated in the mixture also comprise a bonding agent.

13. The method according to claim 1, characterized in that the products incorporated in the mixture also comprise a mould release agent.

14. The method according to claim 1, characterized in that, on incorporation of the particles, a specific surface area of the particles is less than 130 $m^2 \cdot g^{-1}$.

15. The method according to claim 1, characterized in that in the polymer is a fluoroelastomer.

16. The method according to claim 15, characterized in that in the fluoroelastomer is a perfluoroelastomer.

* * * * *